(12) United States Patent
Warshawsky (10) Patent No.: US 7,203,624 B2
(45) Date of Patent: Apr. 10, 2007

(54) REAL-TIME DATABASE PERFORMANCE AND AVAILABILITY CHANGE ROOT CAUSE ANALYSIS METHOD AND SYSTEM

(75) Inventor: Ron Warshawsky, Santa Clara, CA (US)

(73) Assignee: DBA Infopower, Inc., Santa Clara, CA (US)

( * ) Notice: Subject to any disclaimer, the term of this patent is extended or adjusted under 35 U.S.C. 154(b) by 0 days.

(21) Appl. No.: 11/283,793

(22) Filed: Nov. 22, 2005

(65) Prior Publication Data

US 2006/0112135 A1      May 25, 2006

Related U.S. Application Data

(60) Provisional application No. 60/630,701, filed on Nov. 23, 2004.

(51) Int. Cl.
*G06F 11/30* (2006.01)

(52) U.S. Cl. ........................................ 702/186; 714/25

(58) Field of Classification Search ................ 702/106, 702/182–185, 188, 186, 176, 177; 701/29, 701/31, 32, 35; 714/25
See application file for complete search history.

(56) References Cited

U.S. PATENT DOCUMENTS

| | | | |
|---|---|---|---|
| 6,256,628 B1 | 7/2001 | Dobson et al. | |
| 6,738,757 B1 | 5/2004 | Wynne et al. | |
| 6,738,933 B2 | 5/2004 | Fraenkel et al. | |
| 6,804,627 B1 | 10/2004 | Marokhovsky et al. | |
| 6,898,556 B2 | 5/2005 | Smocha et al. | |
| 6,910,036 B1 | 6/2005 | Shee | |
| 6,957,396 B2 | 10/2005 | Iwamura | |
| 2003/0097438 A1* | 5/2003 | Bearden et al. | 709/224 |
| 2005/0172306 A1* | 8/2005 | Agarwal et al. | 719/328 |
| 2006/0020924 A1* | 1/2006 | Lo et al. | 717/127 |

* cited by examiner

*Primary Examiner*—Edward Raymond
(74) *Attorney, Agent, or Firm*—Connolly Bove Lodge & Hutz LLP; Jeffrey W. Gluck (57) ABSTRACT

Root cause analysis of changes impacting database performance, availability and continuity to the underlying business may be performed. A system for doing so may include analytical and visual comparison root cause analysis engines to identify changed database performance statistical parameters (such as CPU consumption, physical I/O, etc) related to a historical period of time on a single database or across multiple databases. Result data may be displayed through a series of charts and reports that may indicate whether correlations exist between unexpected database performance and relative changes in database performance statistical parameters. A visual root cause analysis system may further apply noise reduction algorithms to clarify trends in changes of database system performance.

37 Claims, 4 Drawing Sheets

REAL-TIME DATABASE PERFORMANCE AND AVAILABILITY CHANGE ROOT CAUSE ANALYSIS METHOD AND SYSTEM

CROSS-REFERENCE TO RELATED APPLICATION

This application claims the priority of U.S. Provisional Patent Application No. 60/630,701, filed on Nov. 23, 2004, and incorporated herein by reference.

FIELD OF THE INVENTION

The present invention relates to databases in general, and more particularly to root cause analysis of performance, availability and scalability issues impacting databases.

BACKGROUND OF THE INVENTION

Modern database system architectures having dozens if not hundreds of databases that serve multiple hundreds to thousands of business transactions per second and hundreds of thousands of data selection requests. Such systems generally suffer from exhaustion of computation resources, poor response times and lack of availability. A necessary requirement of such architecture is to maintain ability to identify root cause of above-mentioned issues in a shortest time possible.

Current ways of researching these issues include:
  Displaying current database performance statistics counters—used by most of the databases (for example by Oracle, DB2, MySQL, SQL Server, etc.); and
  Taking a snapshot of database performance statistic counters from time points T(i) and T(i+1), and generating a report that displays differences in statistical values (used by Oracle Statspack and Oracle AWR, for example).

The first approach helps in some cases to identify if a certain number of instrumented statistical parameter values are exceptionally high, while the second approach helps to see what are the changes in instrumented statistical parameters over the single period of time.

However, when a database system experiences performance or availability problems, displaying current database performance statistics counters and generating simple time-differential reports is often not enough to diagnose and repair the system in a timely manner. The database administrator (DBA) must generate multiple reports from the time periods when database performance was normal and manually compare hundreds of recorded parameters to identify what changed and which change has had the most impact on the database performance. The task becomes enormously difficult when multiple databases are involved. Under these circumstances, it is almost impossible for a DBA to troubleshoot performance troubles in real time, when performance problem resolution promptness is extremely critical.

BRIEF DESCRIPTION OF THE DRAWINGS

Various embodiments of the invention are described below in connection with the attached drawings, in which.

DETAILED DESCRIPTION OF EMBODIMENTS OF THE INVENTION

Comprising an analytical and visual comparison root cause analysis engine, embodiments of the inventive system analyze data collected by a database performance statistics collection engine that collects database performance statistics data periodically (for example, every 15 minutes) or on user demand (for example, Statspack or AWR for Oracle databases) and reports to the end user quantitative changes in database system performance based on user provided absolute or percentage thresholds or combinations of absolute and percentage thresholds.

Embodiments of the inventive system incorporate a user interface, a database performance change analysis module, a visual data representation module and a batch reporting module.

The user interface system, according to some embodiments of the invention, may be used to guide a user through the process of selecting one or more databases for the root cause analysis, setting proper analysis thresholds and setting proper time analysis ranges. The user interface may allow the user to select a time range for analysis as a time difference between a provided end time and a provided or predetermined start time, or as a time amount counting back from the current time (e.g., a request to analyze one week of the most current data), or as a time difference between timestamps related to provided unique snapshot record numbers, for example, an end number and a start number.

For a relative change analysis, a user may be requested to select two mandatory time ranges—a baseline time range (for example, when database system performance was adequate) and an analysis time range (for example, to be investigated for questionable performance).

For a visual root cause analysis, the user may be requested to select two time ranges—a mandatory current time range to investigate and an optional historical time range of equal length to superimpose over current data.

Based on user input, the above mentioned modules create queries, for example, using SQL, that access data collected by the database performance statistics collection engine.

Database performance statistical data may be stored, for example, in the form of multiple tables in a relational database. Each table contains zero to many data rows that store information in a structured form of one to many columns. Each column has a specific data type (for example, character or number), length and precision (appropriate for number fields).

In some embodiments of the invention, every database performance statistics data record stores a unique time stamp and/or unique record number of the collection, together with the values of performance statistics data. Such embodiments may include database performance statistics data counters that are constantly incremented (starting from zero values) from the moment when the database is started until the moment when the database is shutdown.

Based on unique data record identifier or unique time stamp, the change analysis module may identify minimal and maximal data records related to the time range and may calculate value differences between corresponding field values between records.

During relative change analysis, performance statistic value differences are calculated for both baseline and analysis time ranges. In a further step, a difference of differences may be calculated in order to provide a measure of relative change in database performance.

When the above-said difference exceeds a user provided absolute or percentage threshold (or both), the above-said difference is subsequently packaged and transmitted to the output report media.

During visual root cause analysis, performance statistic value differences are calculated between current and previous performance statistic values for all records included in a predetermined time range and a predetermined superimpose time range (each of which may, e.g., be user selected). These may then be plotted as a chart, which may comprise a data set display area, a vertical database performance statistic value axis and a horizontal axis of time. A methodology that may be used by visual root cause analysis will be described in detail in reference to FIG. 3.

Figure 1:
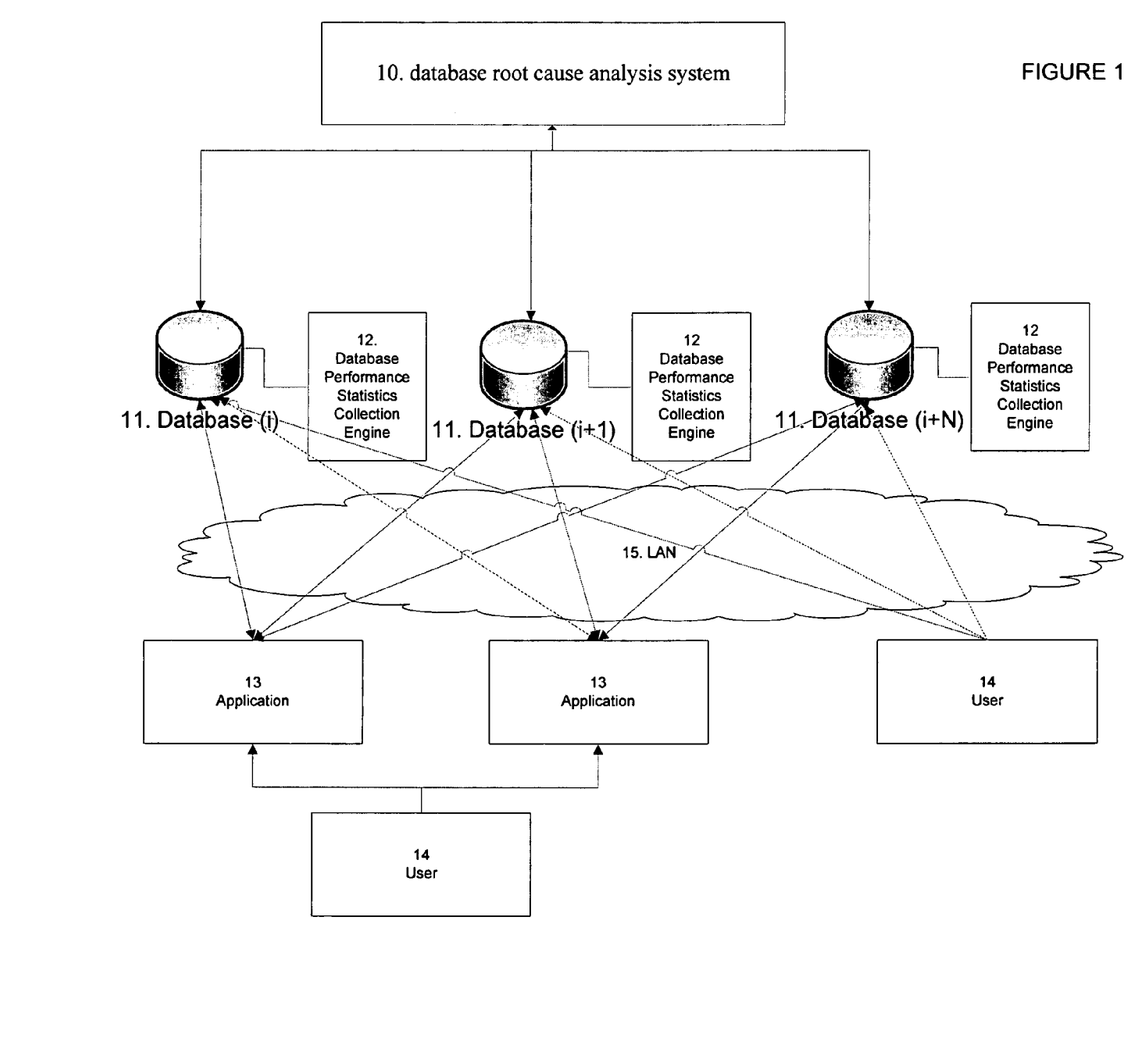
FIG. 1 is a schematic diagram of an embodiment of an overall system suitable for use in implementing the present invention.

FIG. 1 shows a typical basic system used in connection with embodiments of the present invention. As seen in FIG. 1, one or more databases are provided. Databases 11 are accessed by a number of users 14 directly or through the applications 13. Applications 13 are typically provided by third-party companies or by developers within the company that uses databases 11. Database 11 understands and executes query language (e.g., SQL) statements embedded into applications 13 or issued directly by database users 14 and, upon execution, sends requested information back to the user 14 or application 13 over the network (e.g., LAN 15).

To provide visibility for the database administrator (DBA) on database resource consumption caused by query execution, database 11 may maintain internal structures that record in a form of accumulators/counters values of different database performance statistics (for example, I/O statistics, such as physical reads and writes; network statistics, such as information sent to database clients; and/or database contention statistics, such as latches, locks and enqueues). To collect and store such performance statistics, databases 11, among other components, may contain a database performance statistics collection engine 12 (for example, but not limited to, Oracle Statspack or Oracle AWR). Database performance statistics collection engine 12 is scheduled to collect performance data snapshot on a regular basis and/or may run manually on user request. Every performance snapshot is assigned a number and run-time time stamp.

Currently, in order to analyze data collected by database performance statistics collection engine 12, a DBA chooses two snapshot points of time and runs a vendor provided program to generate a report that displays differences of values of database performance statistics between these points of time. In addition, such reports may display values of database performance statistics in some order (e.g., descending order). Another option for a DBA is to run custom queries on tables used by database performance statistics collection engine 12 to obtain said information directly.

In most cases of database performance/availability degradation, a single such report is not useful in performing root cause analysis. Knowing that certain database performance statistics have changed does not provide information on when this change started and how the magnitude of change is different from the historical rate of change. To understand dynamics of changes in database performance, a DBA needs to generate a significant number of reports and to analyze them by comparing similar statistics between/among the reports.

For the following reasons, performing manual root cause analysis is extremely work intensive, error prone and time consuming, an that makes it very hard and impractical to utilize in fast-paced operational environments of databases 11:

High number of database performance statistics snapshot collections that need to be analyzed (generally, database performance statistics snapshot collections are taken between once every five minutes to once per hour, where one collection every fifteen minutes seems to be optimal for most database systems);

Hundreds of database performance parameters that need to be analyzed for every snapshot and across multiple snapshots and across multiple databases;

Extremely tense troubleshooting/analysis work conditions during database performance/availability crises that a DBA who is performing root cause analyses is subjected to, which frequently causes errors in manual analysis.

Embodiments of the invention provide a database root cause analysis system 10 to address such deficiencies with the manual root cause analysis. Database root cause analysis system 10 communicates with the database to access database performance statistics snapshot data collected by database performance statistics collection engine 12. Database root cause analysis system 10 can produce a root cause analysis report that is much more easily analyzed by the DBA than those generated in the manual analysis method. The report generated includes only data that provides information on root cause of database performance/availability problems. An exemplary methodology that may be used by root cause analysis system 10 is discussed in detail with reference to FIG. 2. Database root cause analysis system 10 may be implemented in the form of hardware, software, firmware, or combinations thereof.

Figure 2:
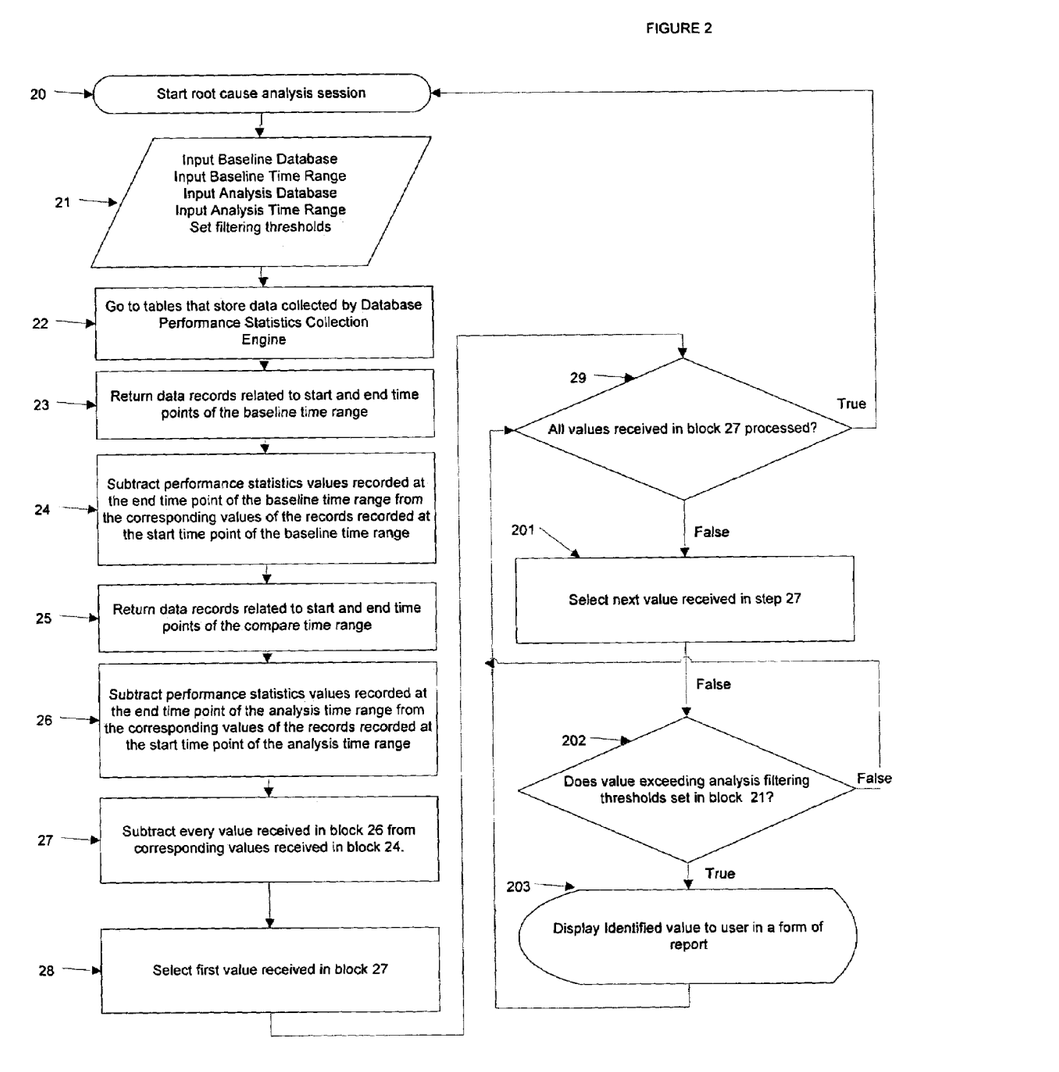
FIG. 2 is a block diagram representing steps that may be taken to calculate and display change root cause analysis of data collected by a database performance statistics collection engine, according to some embodiments of the invention.

The methodology of FIG. 2 begins by obtaining input or reading corresponding data from a configuration file on baseline and analysis databases to perform comparative root cause analysis on, baseline and analysis time ranges and analysis filtering thresholds, as shown at block 21. Note that the analysis filtering thresholds can be set as a minimum absolute or percentage value, or as a combination of both. The process continues by accessing tables that store database performance statistics snapshots collected by database performance statistics collection engine 12, as shown at block 22 and reading data records that are related to the baseline time range, as shown at block 23. Next, values of the statistics belonging to the end of the baseline time range are subtracted from the corresponding values belonging to the beginning of the baseline time range, as shown at block 24. The end result of this subtraction is changes in statistics values for the duration of the baseline time range. Similar data read and subtraction steps are performed for the data records related to the end and beginning of the analysis time range, as shown at block 25 and block 26. In this case, the end result of the subtraction is changes in statistics values for the duration of the analysis time range. The process continues by consequently subtracting changes in statistics values for the duration of the baseline time range from the changes in statistics values for the duration of the analysis time range, as shown in block 27. Next, the process may filter every value obtained as a result of the above subtraction using filtering thresholds previously obtained, as shown in block 28, block 29, block 201, block 202. Finally, the process may output end results to the end user, as shown at block 203.

The above-described methodology of change root cause analysis can be applied to analysis of database performance statistics associated with a single database, multiple databases, and/or physical and/or logical database clusters, where database performance statistics related to logical or physical clusters may be determined, for example, as a sum of statistics across database nodes belonging to the cluster. A physical database cluster is a group of dependent database nodes (for example, database nodes, in the case of DB2, or database instance nodes, in the case of Oracle) functioning and working together to accomplish a single task. A logical database cluster is a group of independent database nodes that can be logically considered by a user as a virtual single database.

Another embodiment of the invention involves a visual root cause analysis that provides a user of the root cause analysis system 10 with the visual charts that help to identify timing and reason of the changes in database system performance. Based on selected database performance statistics, database root cause analysis system 10 may produce charts for visual root cause analysis. An exemplary methodology that may be used by root cause analysis system 10 to do this is discussed in detail with reference to FIG. 3, which will be discussed in further detail below.

Charting of data points within a data set is a technique well known in the art and is not central to this invention. Such techniques are described widely in technical and scientific literature. However, directly charting database performance statistics using data collected by a database performance statistics collection engine 12 is not helpful due to the fact that recorded data represent constantly increasing values of the database performance statistics. This makes such charts constantly growing (for example, a growing line) and does not reveal relative changes in the behavior of the database performance statistics.

To address these issues, embodiments of the invention use a methodology that transforms an initial data set containing absolute database performance statistic values into a data set that represents relative changes in the values of the database performance statistic from one point in time to the next one. The resulting data set further allows cross-statistic and/or cross-database analysis, with the ability to superimpose multiple time ranges on the data. The methodology is best understood with reference to FIG. 3.

Figure 3:
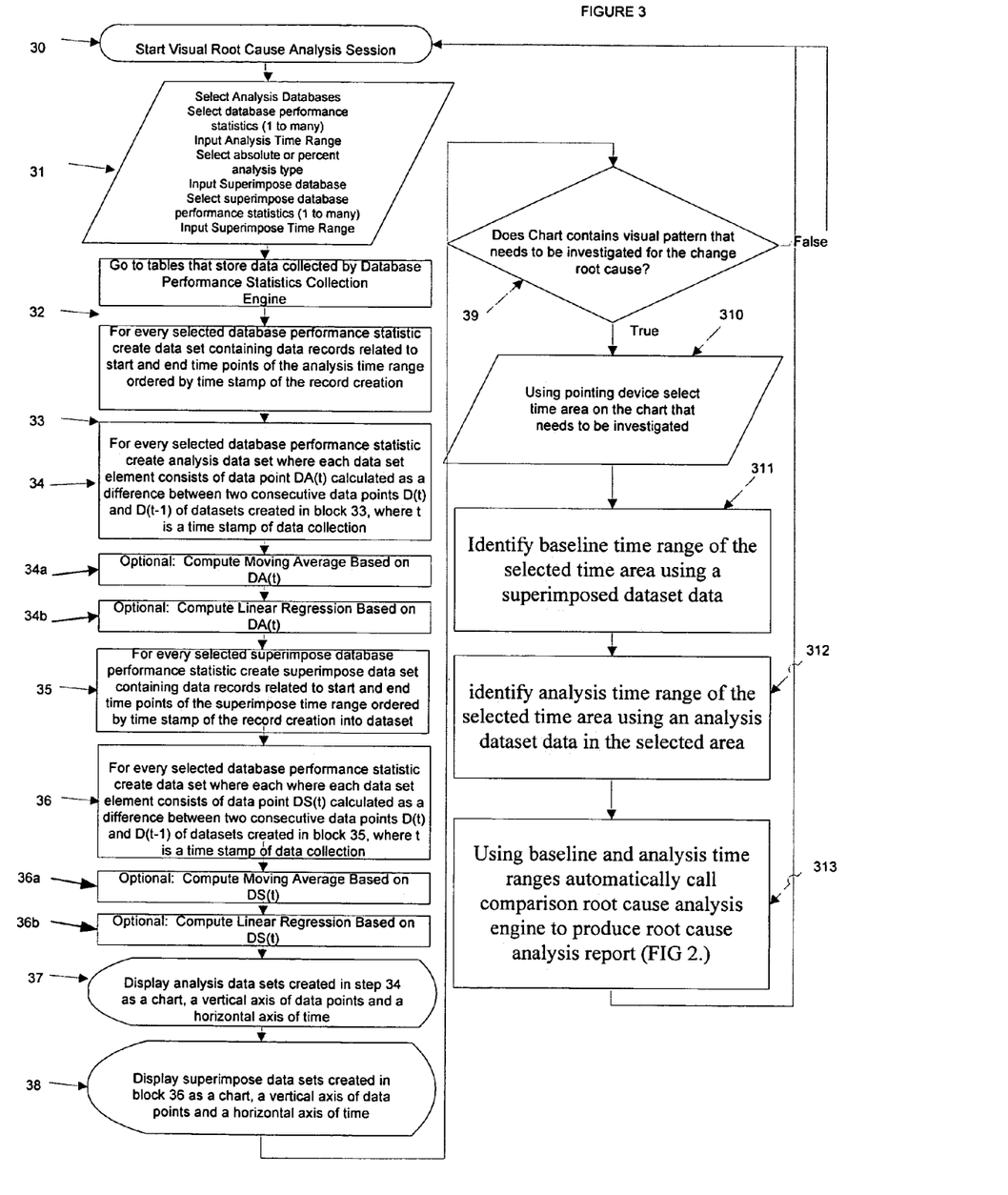
FIG. 3 is a block diagram representing steps that may be taken to calculate and display performance statistics, according to some embodiments of the invention.

The methodology of FIG. 3 begins with obtaining input on analysis database, database performance statistics to analyze, analysis time range, type of the visual root cause analysis—absolute and/or percent value, superimpose database, superimpose performance statistics to analyze and superimpose time range, where superimpose inputs are optional, as shown at block 31. Using the provided analysis time range and analysis database performance statistics, the process creates data sets from data records of the tables that store database performance statistics snapshots collected by database performance statistics collection engine 12, as shown at block 32 and block 33.

As a next step, the process transforms every input data set, as discussed above, into an analysis data set, where each data set element consists of data point DA(t) calculated as an absolute or percent difference (depending on selected analysis type) between two consecutive data points D(t) and D(t−1) of the corresponding data set, where t is a time stamp of data collection, as shown at block 34. If the absolute value analysis option is selected, the difference value of data point DA(t) is calculated as D(t)−D(t−1). If the percent value analysis option is selected, the difference value of data point DA(t) is calculated as 100*(D(t)−D(t−1)/D(t−1).

If and when superimpose analysis needs to be performed, using the provided superimpose time range and superimpose database performance statistics, the process creates data sets from data records of the tables that store database performance statistics snapshots collected by database performance statistics collection engine 12, as shown in block 35. As a next step, the process transforms every data set into a superimpose analysis data set, where each data set element consists of a data point DS(t) calculated as an absolute or percent difference (depending on selected analysis type) between two consecutive data points D(t) and D(t−1) of the corresponding data set, where t is a time stamp of data collection, as shown in block 36. If the absolute value analysis option is selected, the difference value of data point DS(t) is calculated as D(t)−D(t−1). If the percent value analysis option is selected, the difference value of data point DS(t) is calculated as 100*(D(t)−D(t−1))/D(t−1).

Upon completion of the superimpose analysis data set, the process may display the created analysis and superimpose analysis data sets in a chart, which may have a vertical axis of data points and a horizontal axis of time, as shown in blocks 37 and 38.

When a chart is displayed, a user may interactively select multiple time ranges on a chart, as shown in block 39 and block 310. After time ranges are selected, they may be used as an input for the root cause analysis report as a baseline time range and an analysis time range, as shown in blocks 311 and 312. A root cause analysis report is generated, as shown in block 313. Optionally, user confirmation may be required prior to report generation.

User interaction, therefore, is at least provided for:

Selecting analysis time range; and

Selecting baseline time range.

When an analysis or superimpose analysis data set contains a large number of data points, the resulting chart may be extremely hard to interpret due to the limited space of charting area (that is usually limited by the size of a physical display device) and wide distribution of the charted values. To address this issue, embodiments of the invention may provide an option to calculate and chart a moving average of the database performance statistic analysis data set and superimpose analysis data set. These options are reflected in FIG. 3 in blocks 34a and 36a; note that these blocks may be placed at other points of the process, if desired. This methodology may be implemented according to the formula:

$$MA(t,k)=(VAL(t-k+1)+VAL(t-k+2)+ \ldots +VAL(t))/k,$$

where MA(t,k) is moving average value of the data value related to corresponding time period "t", where averaging period value is k, and length of period k is greater then length of period t, i.e., k>t. Furthermore, VAL(t) is a data point value in the time period t, and VAL(t−k+1) is a data point value in the point of time period t−k+1, where k is the value of the averaging period, discussed above.

To enable database workload and capacity forecasting, the ability to project and estimate current and future growth (or decrease) of the database performance statistic may be useful. To address this, embodiments of the invention may provide an option to calculate and chart linear regression of the database performance statistic analysis data set and/or the superimpose analysis data set. For example, one embodiment of the present invention may use the method of least squares linear regression to fit a line to the original data set.

Such a linear regression analysis produces an equation in slope intercept form y=mx+b. These options are reflected in FIG. 3 in blocks 34b and 36b; note that these blocks may be placed at other points of the process, if desired. While an example of least squares linear regression is discussed here, the invention is not limited to least squares linear regression, nor is it limited to linear regression.

The above-described methodology of visual root cause analysis and workload forecasting can be applied to analysis of database performance statistics associated with a single database, multiple databases, and/or physical and/or logical database clusters, where database performance statistics related to logical or physical clusters may be determined, for example, as a sum of statistics across database nodes belonging to the cluster. A physical database cluster is a group of dependent database nodes (for example, database nodes, in the case of DB2, or database instance nodes, in the case of Oracle) functioning and working together to accomplish a single task. A logical database cluster is a group of independent database nodes that can be logically considered by a user as a virtual single database.

Figure 4:
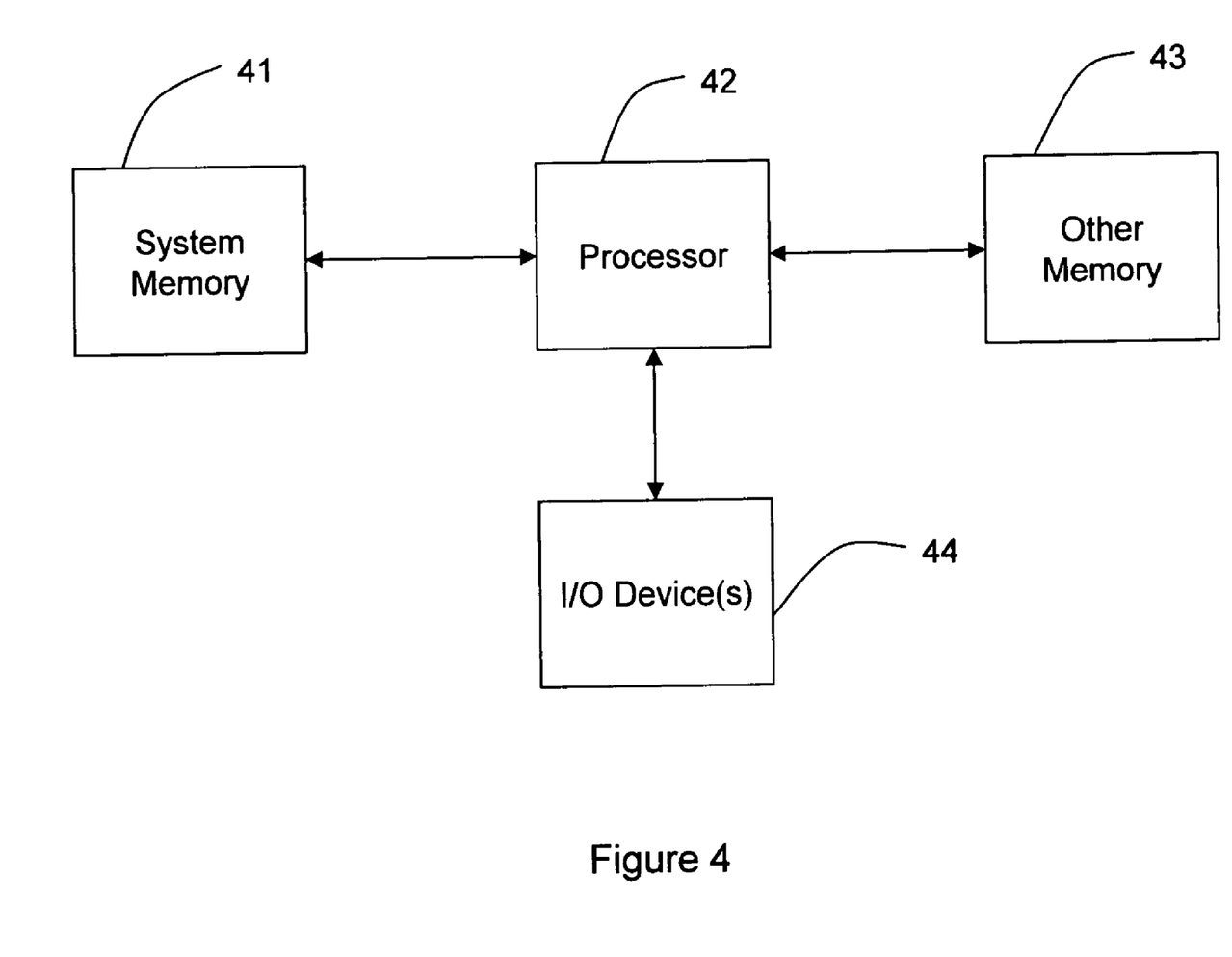
FIG. 4 is a block diagram of a system that may be used to implement some embodiments of the invention.

Some embodiments of the invention, as discussed above, may be embodied, at least in part, in the form of software instructions on a machine-accessible medium. Such an embodiment may be illustrated in FIG. 4. The computer system of FIG. 4 may include at least one processor 42, with associated system memory 41, which may store, for example, operating system software and the like. The system may further include other additional memory 43, which may, for example, include software instructions to perform various applications. System memory 41 and other memory 43 may comprise separate memory devices, a single shared memory device, or a combination of separate and shared memory devices. The system may also include one or more input/output (I/O) devices 44, for example (but not limited to), keyboard, mouse, trackball, printer, display, network connection, etc. The present invention, or parts thereof, may be embodied as software instructions that may be stored in system memory 41 or in other memory 43. Such software instructions may also be stored in removable or remote media (for example, but not limited to, compact disks, floppy disks, etc.), which may be read through an I/O device 44 (for example, but not limited to, a floppy disk drive). Furthermore, the software instructions may also be transmitted to the computer system via an I/O device 44, for example, a network connection; in such a case, a signal containing the software instructions may be considered to be a machine-accessible medium. The system of FIG. 4 may be coupled to various hardware components shown in FIG. 1.

While various embodiments of the invention have been shown and described, it will be apparent to those skilled in the art that various modifications may be made in these embodiments without departing from the spirit of the present invention. For that reason, the scope of the invention is set forth in the following claims.

What is claimed is:

1. A computer readable medium having computer-executable instructions that, when executed by a processor, cause the processor to perform a method of root cause analysis of database system performance and availability issues, the method comprising: obtaining a value of database-related quantities in a single database selected from the group consisting of database parameters and database performance statistics at a beginning point of time T(i); obtaining a value of each of said one or more database-related quantities in a single database at an ending point of time T(i+1); calculating and recording value differences between ending and starting values for each of said one or more database-related quantities in a single database and recording the duration between T(i) and T(i+1) and a current time stamp; and enabling a user to view the difference for each of said one or more database-related quantities in a single database to determine at least one item selected from the group consisting of: a greatest absolute value, a greatest percent increase, and an impact on performance of the database system.

2. The computer readable medium of claim 1, wherein said one or more database-related quantities are related to database query language statement statistics associated with one or more database query language statements executed in one or more databases.

3. A computer readable medium having computer-executable instructions that, when executed by a processor, cause the processor to perform a method of root cause analysis of database system performance and availability issues, the method comprising:
obtaining value difference values of each of one or more database-related quantities selected from the group consisting of database parameters and database performance statistics at a beginning point of time T(i);
obtaining value difference values of each of said one or more database-related quantities at an ending point of time T(i+1);
obtaining a value of each of said one or more database-related quantities at another beginning point of time T(j);
obtaining a value of each of said one or more database-related quantities at another ending point of time T(j+1);
calculating and recording value differences between ending and starting values for each of said one or more database-related quantities and recording the duration between T(i) and T(i+1) and a current time stamp, said value differences collectively denoted VAL(i);
calculating and recording value differences between ending and starting values for each of said one or more database-related quantities for the starting time T(j) and the ending time T(j+1), and recording the duration between T(j) and T(j+1) and a current time stamp, said value differences collectively denoted VAL(j);
calculating and recording at least one value difference between VAL(j) and VAL(i); and
enabling a user to review the difference for each database-related quantity to determine at least one item selected from the group consisting of: a relative value of increase or decrease; and impact of a relative value of increase or decrease on performance of a database system between two performance collection periods.

4. The computer readable medium of claim 3, wherein said calculating comprises:
determining a relative increase or decrease between the VAL(i) and VAL(j) values in percent.

5. The computer readable medium of claim 4, wherein said calculating further comprises:
determining said relative increase or decrease as a difference of a percent value of a total sum of corresponding database-related quantities.

6. The computer readable medium of claim 4, wherein a difference for each database-related quantity is reviewable only when it exceeds a user defined percent value threshold.

7. The computer readable medium of claim 4, wherein a difference for each database-related quantity is reviewable only when it exceeds user provided absolute and percent values.

8. The computer readable medium of claim 3, wherein a difference for each database-related quantity is reviewable only when it exceeds a user defined absolute value threshold.

9. The computer readable medium of claim 3, wherein a difference for each database-related quantity is reviewable only when it exceeds user provided absolute and percent values.

10. The computer readable medium of claim 3, wherein said one or more database-related quantities are related to database query language statement statistics associated with one or more database query language statements executed in one or more databases.

11. A computer readable medium having computer-executable instructions that, when executed by a processor, cause the processor to perform a method of calculating and displaying single database performance statistic data on a single database comprising:
  identifying sets of data points from a set of single database performance statistics for a single database, wherein each database performance data point is calculated and recorded as a difference between database performance statistic values of two adjacent data points in time $T(i)$ and $T(i+1)$ and wherein a corresponding timestamp value is recorded; and
  displaying the data points on a chart, said chart comprising a data set display area, a vertical database performance statistic value axis, and a horizontal axis of time.

12. The computer readable medium of claim 11, wherein said difference between database performance statistic values is expressed in at least one of the forms selected from the group consisting of the following: absolute value and percent value.

13. The computer readable medium of claim 11, wherein said sets of data points are calculated and displayed on a same chart for a single similar statistic across multiple physical databases.

14. The computer readable medium of claim 11, wherein said sets of data points are calculated and displayed on a same chart for a single similar statistic for a logical database cluster, wherein said logical database cluster comprises two or more physical databases.

15. The computer readable medium of claim 11, wherein said sets of data points are calculated and displayed on a same chart for multiple database performance statistics for a single physical database.

16. The computer readable medium of claim 11, wherein said sets of data points are calculated and displayed on a same chart for multiple database performance statistics for multiple physical databases.

17. The computer readable medium of claim 11, wherein said sets of data points are calculated and displayed on a same chart for multiple database performance statistics for a logical database cluster, wherein said logical database cluster comprises two or more physical databases.

18. The computer readable medium of claim 11, further comprising additional computer-executable instructions such that the method further comprises:
  calculating at least one set of data points on a same database performance statistic using data from historical time periods of equal time span to $(T(i+1)-T(i))$ to thus obtain one or more sets of historical data points; and
  displaying said one or more sets of historical data points on said chart, along with said one or more sets of data points.

19. The computer readable medium of claim 18, wherein said sets of data points are calculated and displayed on a same chart for a single similar statistic across multiple physical databases.

20. The computer readable medium according to claim 19, further comprising computer-executable instructions such that the method further comprises:
  obtaining from a user a database performance statistic moving average period; and
  calculating a database performance statistic moving average data set based on the sets of data points using said moving average period.

21. The computer readable medium according to claim 19, further comprising computer-executable instructions such that the method further comprises:
  calculating a database performance statistic regression data set based on the sets of data points.

22. The computer readable medium of claim 18, wherein said sets of data points are calculated and displayed on a same chart for a single similar statistic for a logical database cluster, wherein said logical database cluster comprises two or more physical databases.

23. The computer readable medium according to claim 22, further comprising computer-executable instructions such that the method further comprises:
  obtaining from a user a database performance statistic moving average period; and
  calculating a database performance statistic moving average data set based on the sets of data points using said moving average period.

24. The computer readable medium according to claim 22, further comprising computer-executable instructions such that the method further comprises:
  calculating a database performance statistic regression data set based on the sets of data points.

25. The computer readable medium of claim 18, wherein said sets of data points are calculated and displayed on a same chart for multiple database performance statistic for a single physical database.

26. The computer readable medium according to claim 25, further comprising computer-executable instructions such that the method further comprises:
  obtaining from a user a database performance statistic moving average period; and
  calculating a database performance statistic moving average data set based on the sets of data points using said moving average period.

27. The computer readable medium according to claim 25, further comprising computer-executable instructions such that the method further comprises:
  calculating a database performance statistic regression data set based on the sets of data points.

28. The computer readable medium of claim 18, wherein said sets of data points are calculated and displayed on a same chart for multiple database performance statistic for a multiple physical database.

29. The computer readable medium of claim 18, wherein said sets of data points are calculated and displayed on a same chart for multiple database performance statistics for a logical database cluster, wherein said logical database cluster comprises two or more physical databases.

30. The computer readable medium according to claim 29, further comprising computer-executable instructions such that the method further comprises:
  obtaining from a user a database performance statistic moving average period; and calculating a database performance statistic moving average data set based on the sets of data points using said moving average period.

31. The computer readable medium according to claim 29, further comprising computer-executable instructions such that the method further comprises:
calculating a database performance statistic regression data set based on the sets of data points.

32. The computer readable medium according to claim 28, further comprising computer-executable instructions such that the method further comprises:
obtaining from a user a database performance statistic moving average period; and
calculating a database performance statistic moving average data set based on the sets of data points using said moving average period.

33. The computer readable medium according to claim 28, further comprising computer-executable instructions such that the method further comprises:
calculating a database performance statistic regression data set based on the sets of data points.

34. The computer readable medium according to claim 11, further comprising computer-executable instructions such that the method further comprises:
obtaining from a user or using default database performance statistic moving average period; and
calculating a database performance statistic moving average data set based on the values of said database performance statistic using said moving average period.

35. The computer readable medium according to claim 11, further comprising computer-executable instructions such that the method further comprises:
computing a database performance statistic moving average period as a user defined ratio of an overall time span of underlying data values of a database statistic data set; and
calculating a database performance statistic moving average data set based on the values of said database performance statistic using said moving average period.

36. The computer readable medium of claim 11, wherein said database-related quantities are related to database query language statement statistics associated with one or more database query language statements executed in one or more databases.

37. The computer readable medium according to claim 11, further comprising computer-executable instructions such that the method further comprises:
calculating a database performance statistic regression data set based on the sets of data points.

* * * * *